United States Patent
Maeda

(10) Patent No.: US 6,657,608 B2
(45) Date of Patent: *Dec. 2, 2003

(54) LIQUID CRYSTAL DEVICE AND ELECTRONIC EQUIPMENT

(75) Inventor: Tsuyoshi Maeda, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 12 days.

This patent is subject to a terminal disclaimer.

(21) Appl. No.: 09/875,166

(22) Filed: Jun. 7, 2001

(65) Prior Publication Data

US 2001/0024184 A1 Sep. 27, 2001

Related U.S. Application Data

(62) Division of application No. 08/952,018, filed on Nov. 14, 1997, now Pat. No. 6,346,932.

(51) Int. Cl.$^7$ .................................................. G09G 3/36
(52) U.S. Cl. ........................ 345/90; 345/87; 349/110; 349/111
(58) Field of Search .............................. 345/87, 90, 92, 345/98, 204, 206, 211, 214, 100; 349/42, 43, 44, 102, 103, 110, 111

(56) References Cited

U.S. PATENT DOCUMENTS

| | | | | |
|---|---|---|---|---|
| 5,047,847 A | * | 9/1991 | Toda et al. ................ | 358/98 |
| 5,103,328 A | * | 4/1992 | Numao ..................... | 359/53 |
| 5,446,570 A | | 8/1995 | Kaneko et al. | |
| 5,786,876 A | * | 7/1998 | Ota et al. .................. | 349/42 |
| 5,805,250 A | | 9/1998 | Hatano et al. | |
| 5,870,160 A | * | 2/1999 | Yanagawa et al. .......... | 349/141 |
| 6,028,577 A | * | 2/2000 | Sakamoto .................. | 345/92 |

FOREIGN PATENT DOCUMENTS

| | | |
|---|---|---|
| JP | 56-91277 | 7/1981 |
| JP | 58-159515 | 6/1983 |
| JP | 58-159515 | 10/1983 |
| JP | 61-2132 | 1/1986 |
| JP | 63-56625 | 3/1988 |
| JP | 3-85526 | 4/1991 |
| JP | 4-237024 | 8/1992 |
| JP | 5-80291 | 4/1993 |
| JP | 5-134240 | 5/1993 |
| JP | 6-160878 | 6/1994 |
| JP | 7-261180 | 10/1995 |
| JP | 171082 | 7/1996 |
| JP | 9-105918 | 4/1997 |

* cited by examiner

Primary Examiner—Vijay Shankar
Assistant Examiner—Mansour M. Said
(74) Attorney, Agent, or Firm—Oliff & Berridge, PLC.

(57) ABSTRACT

A liquid crystal device has a structure in which an electric field is applied across a liquid crystal in a direction substantially parallel to the plane of a substrate. A conductive film is formed on a first substrate on which an electric field control is provided, and also on a color filter substrate located opposite the first substrate, and the conductive films are maintained at either a ground voltage, a common electrode voltage, the center voltage of an image signal, a non-selection voltage of a scanning signal, or a logic voltage of an external driver or otherwise the voltage of the conductive films is maintained in a floating state. The liquid crystal device having the above structure displays a high-quality image without encountering an influence of electrostatic charges.

10 Claims, 13 Drawing Sheets

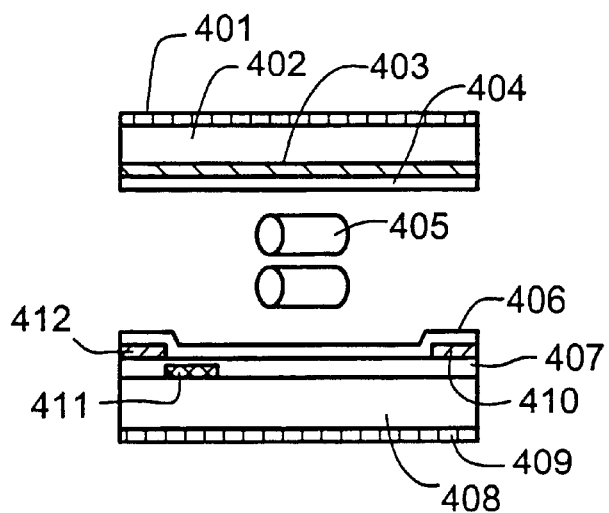
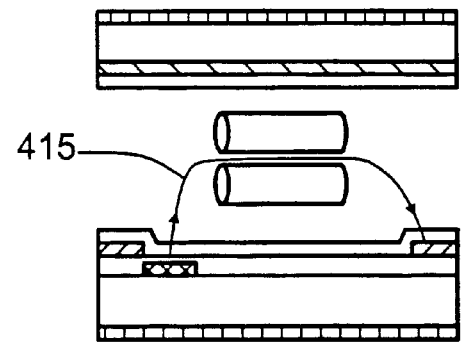
Fig. 4(a)  Fig. 4(b)
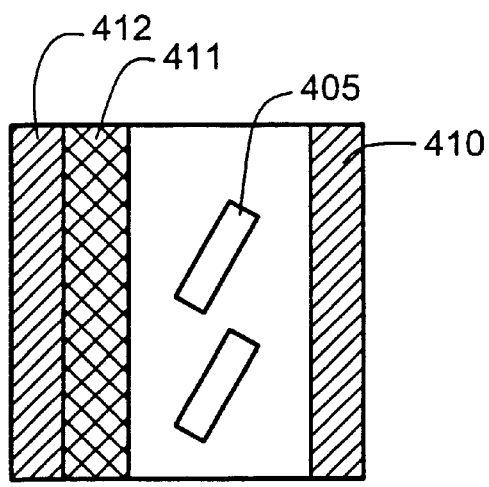
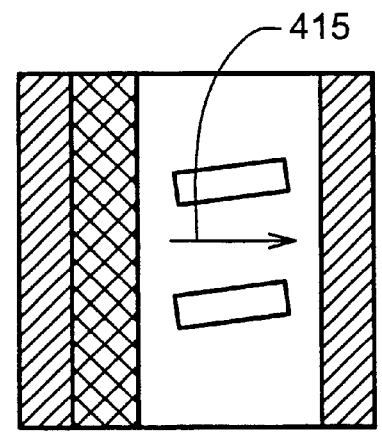
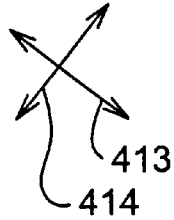
Fig. 4(c)  Fig. 4(d)

LIQUID CRYSTAL DEVICE AND ELECTRONIC EQUIPMENT

This application is a Division of Ser. No. 08/952,018 Nov. 4, 1997 U.S. Pat. No. 6,346,932.

This is a Division of application Ser. No. 08/952,018 filed Nov. 14, 1997 now U.S. Pat. No. 6,346,932. The entire disclosure of the prior application(s) is hereby incorporated by reference herein in its entirety.

FIELD OF THE INVENTION

The present invention relates to an active matrix type liquid crystal device including active elements located at respective pixels (also called picture elements) thereby controlling the voltage applied to the liquid crystal at the respective pixels, and more particularly, to a liquid crystal device of the type in which a voltage is applied in a lateral direction (along the layer) to the liquid crystal at the respective pixels.

The present invention also relates to electronic equipment using such a liquid crystal device.

BACKGROUND TECHNOLOGY

The great majority of liquid crystal devices used in notebook personal computers or liquid crystal TV sets are operated in the twisted nematic mode. However, in the twisted nematic mode, the image displayed on a liquid crystal device looks different depending on the viewing direction. To improve the viewing direction dependence, it has been proposed to employ an in-plane switching (IPS) mode in which a voltage is applied to a liquid crystal in a lateral direction, as disclosed for example in Japanese Unexamined Patent Publication Nos. 56-091277 and 6-160878.

The principle of operation in the IPS mode will be described briefly with reference to some drawings. FIGS. 4a and 4b are cross-sectional views illustrating the behavior of a liquid crystal in a liquid crystal panel designed to operate in the IPS mode, wherein FIG. 4a is a cross-sectional view of a cell without an application of voltage and FIG. 4b is a cross-sectional view of the cell under the application of a voltage greater than a threshold value. The plane views of FIGS. 4a and 4b are given in FIGS. 4c and 4d, respectively. In FIG. 4, reference numerals 401 and 409 denote a pair of polarizing plates, 402 and 408 denote a pair of substrates between which a liquid crystal is disposed, 403 denotes a color filter, 404 and 406 denote orientating films, and 405 denotes a liquid crystal molecule drawn in a schematic fashion. Furthermore, reference numeral 410 denotes a pixel electrode, 411 denotes a common electrode disposed in a pixel at a location opposite to the pixel electrode, 412 denotes an image signal line (source line), and 407 denotes an insulating layer for isolating the pixel electrode 410 and the common electrode 411 from each other. In the IPS-mode liquid crystal device, as can be seen from FIG. 4, the pixel electrode and the common electrode for applying a voltage across the liquid crystal are disposed on one substrate at locations apart in a lateral direction. Reference numeral 413 denotes the absorption axis of the lower polarizing plate and 414 denotes the absorption axis of the upper polarizing plate.

Although an active element such as a TFT (thin film transistor) is also disposed, it is not shown in FIG. 4. FIGS. 4a and 4b are a cross section taken along line X–X' of FIG. 5, and FIGS. 4c and 4d are an enlarged plane view illustrating an area surrounded by a broken line in FIG. 5, wherein FIG. 5 illustrates the structure of one pixel. In the specific example shown in FIG. 5, two common electrodes 502 and one pixel electrode 501 are disposed in a lateral direction in one pixel, whereas there may be some other number of common electrodes 502 and pixel electrodes 501 in one pixel. Furthermore, in FIG. 5, reference numeral 503 denotes a scanning signal line (gate line), 504 denotes an image signal line (source line), and 505 denotes a thin film transistor(TFT).

Of the pair of substrates 402 and 408, as shown in FIGS. 4a and 4c, a color filter 403 is formed on the upper substrate 402, and a line-shaped common electrode 411 and pixel electrode 410 are formed on the inner surface of the lower substrate 408. Furthermore, orientating films 404 and 406 for orientating the liquid crystal molecules 405 are formed on the inner surfaces of the respective substrates. A liquid crystal is disposed between the pair of substrates 402 and 408. When no voltage is applied, the liquid crystal molecules 405 are uniformly orientated at a fixed angle (within the range from 0 to 45) with respect to the longitudinal direction of the line-shaped electrodes (common electrode 411, pixel electrode 410). In the specific example shown in FIG. 4, the angle is set to 30°. On both sides of the liquid cell, there are disposed polarizing plates 401 and 409. The upper polarizing plate 401 is disposed such that its absorption axis 414 becomes parallel to the orientation of the liquid crystal. On the other hand, the lower polarizing plate 409 is disposed such that its absorption axis 414 becomes perpendicular to the orientation of the liquid crystal. In this state, black is displayed in the pixel. The liquid crystal is made up of a material having positive dielectric anisotropy.

If an electric field 415 is applied, the liquid crystal molecules 405 are aligned so that their longitudinal axis is directed in a direction parallel to the electric field 415, as shown in FIGS. 4b and 4d. As a result, the orientation of the liquid crystal molecules 405 come to have a certain angle with respect to the absorption axis of the polarizing plates. The birefringence of the liquid crystal varies in accordance with the orientation angle of liquid crystal molecules which varies in response to the strength of the applied electric field. Thus, it is possible to control the transmission of light through the pair of polarizing plates thereby controlling the brightness.

In this structure, however, the pixel electrode 410 and the common electrode 411 used to apply a voltage across the liquid crystal are formed on only one substrate and there is no electrode on the other-side substrate. This can cause a problem in that the substrate tends to be electrostatically charged. The electrostatic charge disturbs the orientation of the liquid crystal and thus it becomes impossible to display a high-quality image. Once the substrate is electrostatically charged, it is difficult to remove the electrostatic charge because there is no electrode on the other-side substrate.

In view of the above, it is an object of the present invention to provide a liquid crystal device capable of displaying a high-quality image without being electrostatically charged or without being influenced by an electrostatic charge.

SUMMARY OF THE INVENTION

According to an aspect of the present invention, there is provided a liquid crystal device including a pair of substrates with a liquid crystal disposed between them, one of the substrates having, thereon, scanning signal lines and image signal lines disposed in a matrix form, active elements connected to the respective scanning signal lines and image signal lines, a pixel electrode connected to the respective active elements, and a common electrode, thereby making it possible to apply an electric field across the liquid crystal disposed between each pixel electrode and the common electrode in such a manner that the electric field is applied in a direction substantially parallel to the plane of the substrates, wherein a light-shielding metal film is formed on the other-side substrate opposite to the one of the substrate, and a fixed voltage is applied to the light-shielding metal film.

In this structure, the other-side substrate is prevented from being electrostatically charged and thus it is possible to display a high-quality image. If there were no light-shielding metal film disposed on the other-side substrate and maintained at the fixed voltage, the substrate would be electrostatically charged, and as high a voltage as a few ten thousand volts would occur between the other-side substrate and the pixel electrodes and/or the common electrode formed on the one substrate. The liquid crystal would response to that voltage. For the above reason, to achieve a high-quality image, it is important that the light-shielding metal film be formed on the other-side substrate having no electrode for driving. the liquid crystal and be maintained at a fixed voltage Preferably, the light-shielding metal film is made up of chromium (Cr) or a nickel-copper (Ni—Cu) alloy.

According to another aspect of the present invention, there is provided a liquid crystal device including a pair of substrates with a liquid crystal disposed between them, one of the substrates having, thereon, scanning signal lines and image signal lines disposed in a matrix form, active elements connected to the respective scanning signal lines and image signal lines, a pixel electrode connected to the respective active elements, and a common electrode, thereby making it possible to apply an electric field across the liquid crystal disposed between each pixel electrode and the common electrode in such a manner that the electric field is applied in a direction substantially parallel to the plane of the substrates, wherein a transparent conducting film is formed on the other-side substrate opposite to the one of the substrates, and a fixed voltage is applied to the transparent conducting film.

With this structure, the other-side substrate is prevented from being electrostatically charged and thus it is possible to display a high-quality image. If there were no transparent conducting film disposed on the other-side substrate and maintained at the fixed voltage, the substrate would be electrostatically charged, and as high a voltage as a few ten thousand volts would occur between the other-side substrate and the pixel electrodes and/or the common electrode formed on the one substrate. The liquid crystal would response to that voltage. For the above reason, to achieve a high-quality image, it is important that the transparent conducting film be formed on the other-side substrate having no electrode for driving the liquid crystal and be maintained at a fixed voltage. Preferably, the transparent conducting film may be made up of ITO or tin oxide ($SnO_2$).

According to another aspect of the present invention, there is provided a liquid crystal device including a pair of substrates with a liquid crystal disposed between them, one of the substrates having, thereon, scanning signal lines and image signal lines disposed in a matrix form, active elements connected to the respective scanning signal lines and image signal lines, a pixel electrode connected to the respective active elements, and a common electrode, thereby making it possible to apply an electric field across the liquid crystal disposed between each pixel electrode and the common electrode in such a manner that the electric field is applied in a direction substantially parallel to the plane of the substrates, wherein a conductive film is formed on the other-side substrate opposite to the one of the substrates, in the periphery of the pixel area on either the inner surface or the outer surface of the other-side substrate, and a fixed voltage is applied to the conductive film.

With this structure, the other-side substrate is prevented from being electrostatically charged and thus it is possible to display a high-quality image. If there were no conductive film disposed on the other-side substrate and maintained at the fixed voltage, the substrate would be electrostatically charged, and as high a voltage as a few ten thousand volts would occur between the other-side substrate and the pixel electrodes and/or the common electrode formed on the one substrate. The liquid crystal would response to that voltage. For the above reason, to achieve a high-quality image, it is important that the light-shielding metal film be formed on the other-side substrate having no electrode for driving the liquid crystal and be maintained at a fixed voltage. Since the conductive film is formed in areas outside the displaying areas, it is not required that the conductive film be transparent, and thus various metallic materials may be employed to form the conductive film.

Herein, the pixel area refers to such an area in which an element of an image such as a character or a picture is displayed. An example of a pixel area is an area 303 of the liquid crystal cell denoted by a broken line in FIG. 3. The periphery of the pixel area refers to such an area which is located outside the pixel area and which has no capability of displaying an image. In FIG. 3, reference numeral 304 denotes the periphery of the pixel area.

Preferably, the fixed voltage is either a ground voltage, a voltage on the common electrode, the center voltage of the image signal amplitude, a non-selection voltage of the scanning signal, or a logic voltage provided from an external driving means.

In this technique, a proper one of existing voltages in the liquid crystal device can be used without having to generate an additional voltage, and thus it is possible to realize a liquid crystal device capable of displaying a high-quality image and having high resistance to electrostatic charge without causing an increase in cost.

Herein, the common electrode voltage, the center voltage of the image signal amplitude, and the non-selection voltage of the scanning signal refer to such voltages denoted by reference numerals 606, 605, and 607, respectively, in FIG. 6 representing the waveforms of driving signals associated with a liquid crystal panel with TFTs. The waveforms of the driving signals shown in FIG. 6 are described briefly below in junction with an equivalent circuit of a TFT shown in FIG. 7. Signals 602 and 603 are supplied over a scanning line 703 and an imaging signal line 704, respectively, and applied to the gate and source, respectively, of the TFT 705. According to the NTSC standard, an image signal consists of two interlaced fields, that is, a first field 610 and a second field 611, which make up one frame 612 thereby making up one picture. In a selection period 608, if the TFT 705 is turned on by a selection signal supplied via the scanning signal line 703, the voltage 604 of the pixel electrode 701 becomes nearly equal to the voltage 603 of the image signal line 704. In a non-selection signal 609, the TFT 705 is turned off and the signal written in a liquid crystal capacitor 706 is held. The scanning signal lines 703 are selected one by one in a similar manner so that data is rewritten once every one field for all pixels.

According to another aspect of the present invention, there is provided a liquid crystal device including a pair of substrates with a liquid crystal disposed between them, one of the substrates having, thereon, scanning signal lines and image signal lines disposed in a matrix form, active elements connected to the respective scanning signal lines and image signal lines, a pixel electrode connected to the respective active elements, and a common electrode, thereby making it possible to apply an electric field across the liquid crystal disposed between each pixel electrode and the common electrode in such a manner that the electric field is applied in a direction substantially parallel to the plane of the substrates, wherein a polarizing plate having an electrical conductivity is disposed on the outer surface of the other-side substrate opposite to the one substrate, and a fixed voltage is applied to the polarizing plate.

In this structure, the other-side substrate is prevented from being electrostatically charged and thus it is possible to display a high-quality image. If there were no conductive film disposed on the other-side substrate and maintained at the fixed voltage, the substrate would be electrostatically charged, and as high a voltage as a few ten thousand volts would occur between the other-side substrate and the pixel electrodes and/or the common electrode formed on the one substrate. The liquid crystal would response to that voltage. For the above reason, to achieve a high-quality image, it is important that the polarizing plate having an electrical conductivity be formed on the other-side substrate having no electrode for driving the liquid crystal and be maintained at a fixed voltage.

In the present invention, the above-described fixed voltage is either a ground voltage, a voltage on the common electrode, the center voltage of the image signal amplitude, a non-selection scanning signal voltage, or a logic voltage provided from an external driving means.

According to another aspect of the present invention, there is provided a liquid crystal device including a pair of substrates with a liquid crystal disposed between them, one of the substrates having, thereon, scanning signal lines and image signal lines disposed in a matrix form, active elements connected to the respective scanning signal lines and image signal lines, a pixel electrode connected to the respective active elements, and a common electrode, thereby making it possible to apply an electric field across the liquid crystal disposed between each pixel electrode and the common electrode in such a manner that the electric field is applied in a direction substantially parallel to the plane of the substrates, wherein a transparent conducting film is formed on either the inner-side or outer surface of the other-side substrate opposite to the one substrate and the voltage of the transparent conducting film is maintained in a floating state.

In this structure, the other-side substrate is prevented from being electrostatically charged and thus it is possible to display a high-quality image. Even if the liquid crystal device is partially charged, the transparent conducting film prevents the orientation of the liquid crystal from being locally disturbed, and the charge is relaxed over the conductive film. Furthermore, in this technique, since the voltage of the transparent conducting film is maintained in a floating state, no electrical connection is required. In general, if the transparent conducting film is formed on the inner surface of the substrate, that is, in the inside of a liquid crystal cell, a voltage difference occurs between the transparent conducting film and the pixel electrode and/or the common electrode. As a result, degradation in the image quality occurs. However, in the present technique, since the voltage of the conductive film is maintained in the floating state, the degradation in the image quality is suppressed. Preferably, the transparent conducting film is made up of ITO or tin oxide ($SnO_2$).

Herein, the floating state refers to such a state in which a conductive material is electrically isolated from any voltage in adjacent locations and thus the voltage of the conductive material is in a floating state.

According to another aspect of the present invention, there is provided a liquid crystal device including a pair of substrates with a liquid crystal disposed between them, one of the substrates having, thereon, scanning signal lines and image signal lines disposed in a matrix form, active elements connected to the respective scanning signal lines and image signal lines, a pixel electrode connected to the respective active elements, and a common electrode, thereby making it possible to apply an electric field across the liquid crystal disposed between each pixel electrode and the common electrode in such a manner that the electric field is applied in a direction substantially parallel to the plane of the substrates, wherein a conductive film is formed on the other-side substrate opposite to the one of the substrate, in the periphery of the pixel area on either the inner surface or the outer surface of the other-side substrate, and the voltage of the conductive film is maintained in a floating state.

In this structure, the other-side substrate is prevented from being electrostatically charged and thus it is possible to display a high-quality image. Even if the liquid crystal device is partially charged, the transparent conducting film prevents the orientation of the liquid crystal from being locally disturbed, and the charge is relaxed over the conductive film. Furthermore, since the voltage of the transparent conducting film is maintained in a floating state, no electrical connection is required. Since the conductive film is formed in areas outside the displaying areas, it is not required that the conductive film be transparent, and thus various metallic materials may be employed to form the conductive film.

According to another aspect of the present invention, there is provided a liquid crystal device including a pair of substrates with a liquid crystal disposed between them, one of the substrates having, thereon, scanning signal lines and image signal lines disposed in a matrix form, active elements connected to the respective scanning signal lines and image signal lines, a pixel electrode connected to the respective active elements, and a common electrode, thereby making it possible to apply an electric field across the liquid crystal disposed between each pixel electrode and the common electrode in such a manner that the electric field is applied in a direction substantially parallel to the plane of the substrates, wherein a polarizing plate having an electrical conductivity is disposed on the outer surface of the other-side substrate opposite to the one substrate, and the voltage of the polarizing plate is maintained in a floating state.

In this structure, the other-side substrate is prevented from being electrostatically charged and thus it is possible to display a high-quality image. Even if the liquid crystal device is partially charged, the transparent conducting film prevents the orientation of the liquid crystal from being locally disturbed, and the charge is relaxed over the conductive film. Furthermore, since the voltage of the transparent conducting film is maintained in a floating state, no electrical connection is required.

In this structure according to the present invention, the conductive film is formed on the inner or outer surface of the other-side substrate thereby ensuring that the orientation of the liquid crystal is maintained in a desired direction without encountering disturbance. Although the external electrostatic charge can be absorbed even if the conductive film is formed on either the inner or outer surface of the other-side substrate, it is more preferable that the conductive film be formed on the inner surface of the other-side substrate so that the electrostatic charge is absorbed at a location nearer to the liquid crystal layer.

The liquid crystal device constructed in any form described above may be employed as a display device in various electronic equipment.

BRIEF DESCRIPTION OF THE DRAWINGS

FIG. 4 is a schematic representation of the IPS mode;

DETAILED DESCRIPTION OF PREFERRED EMBODIMENTS

The present invention will be described in further detail below with reference to the accompanying drawings.
(First Embodiment)

Figure 1A:
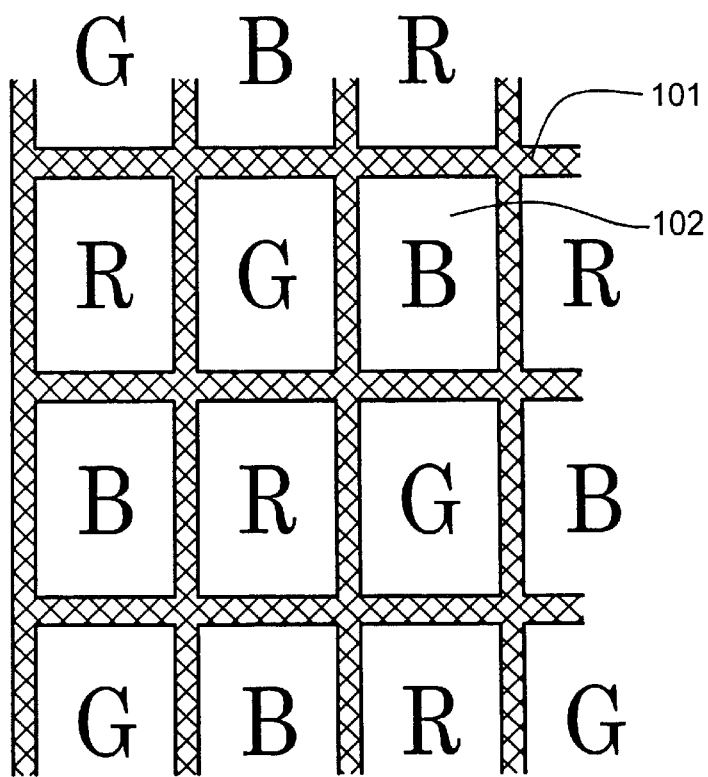
FIG. 1 is a schematic diagram illustrating a liquid crystal device according to the present invention.
Figure 1B:
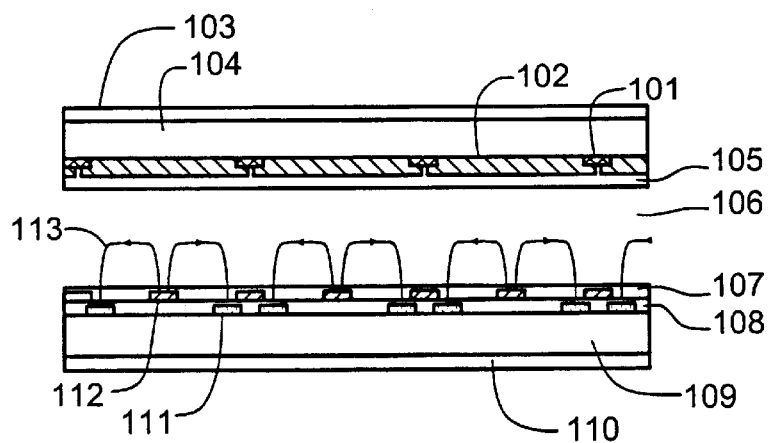

FIG. 1 is a schematic diagram illustrating a main part of a liquid crystal device according to the present invention, wherein FIG. 1a is a plane view of a color filter substrate 104, and FIG. 1b is a cross-sectional view of the liquid crystal device. The structure is described first. Two transparent glass substrates 104 and 109 with a thickness of 1.1 mm are disposed in close proximity to each other, and a liquid crystal layer 106 is disposed between them. A light-shielding chromium (Cr) film 101, a red/green/blue (RGB) color filter 102, and an orientating film 105 are formed one on another on the inner surface of the upper glass substrate 104, and a polarizing plate 103 is disposed on the outer surface of the upper glass substrate 104. Common electrodes 111, an insulating layer 108, pixel electrodes 112, and an orientating film 107 are formed on the inner surface of the lower glass substrate 109, and a polarizing plate 110 is disposed on the outer surface of the lower glass substrate 109.

Figure 5:
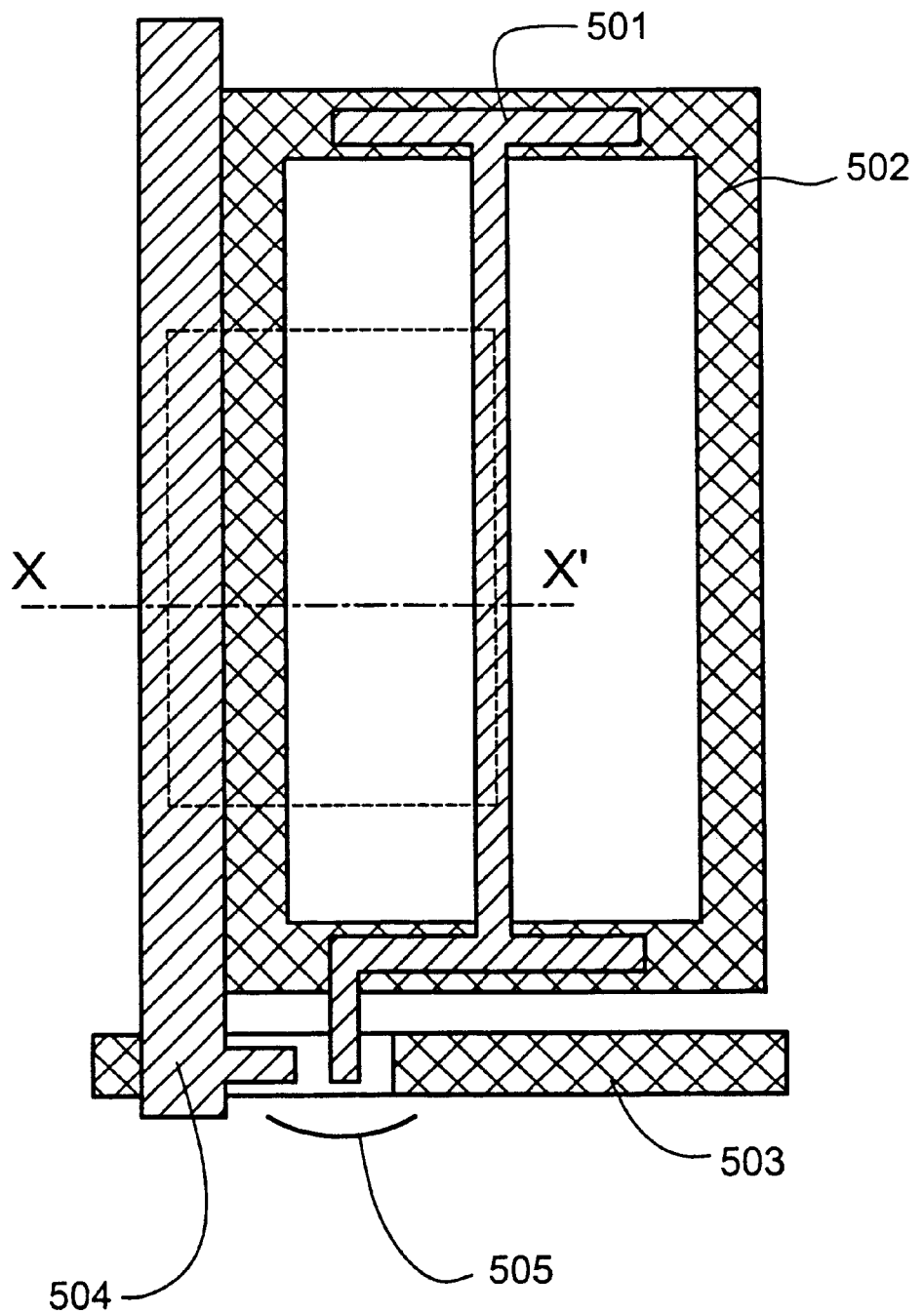
FIG. 5 is a schematic diagram illustrating one pixel of the liquid crystal device according to the present invention.

As described earlier with reference to the plane view of the lower glass substrate shown in FIG. 5, scanning signal lines (gate lines) 503 and image signal lines (source lines) 504 extend in a matrix form across the respective pixels. Thin film transistors (TFTs) 505 are formed near the respective intersections of the scanning signal lines 503 and the image signal lines 504, wherein the gate electrodes of the respective thin film transistors are connected to the corresponding scanning signal lines 503, the source electrodes to the corresponding image signal lines 504, and the drain electrodes to the corresponding pixel electrodes 501 (112).

The light-shielding chromium film 101 shown in FIG. 1 is formed so as to shield, from light, the areas on the lower substrate in which the thin film transistors, the image signal lines, and the scanning signal lines are formed.

As shown in FIG. 1, the common electrode 111 (502) and the pixel electrode 112 (502) in one pixel are located in different layers separated by the insulating layer 108. In FIG. 1, lines 113 denote the direction of the electric field. In this specific embodiment, the upper and lower substrates were spaced by 4.5 $\mu$m, and a nematic liquid crystal having positive dielectric anisotropy and having anisotropy in refractive index $\Delta n=0.070$ was employed as the liquid crystal material 106. The line-shaped common electrodes 111 and the pixel electrodes 112 were spaced by 10 $\mu$m wherein the width was set to 5 $\mu$m for both electrodes. A rubbing orientation process was performed so that the longitudinal axes of the liquid crystal molecules were aligned at 30° with respect to the longitudinal direction of the line-shaped electrodes (common electrodes 111, pixel electrodes 112). The polarizing plate 103 on the upper glass substrate 104 was disposed such that its absorption axis became parallel to the orientation of the liquid crystal. On the other hand, the polarizing plate 110 on the lower glass substrate 109 was disposed such that its absorption axis became perpendicular to the orientation of the liquid crystal. In this state, black is displayed in the pixel. The orientation angle of the liquid crystal molecules varies and thus the birefringence varies in response to a voltage applied from external driving means. Thus, it is possible to control the brightness by changing the applied voltage. Below the lower substrate 109, there is provided a back light source. The manner in which the liquid crystal molecules are orientated and the manner of setting the absorption axes of the polarizing plates are similar to those described above with reference to FIG. 4.

The light-shielding chromium film 101 shown in FIG. 1 is formed so as to shield, from light, the areas on the lower substrate in which the thin film transistors, the image signal lines, and the scanning signal lines are formed.

Figure 6:
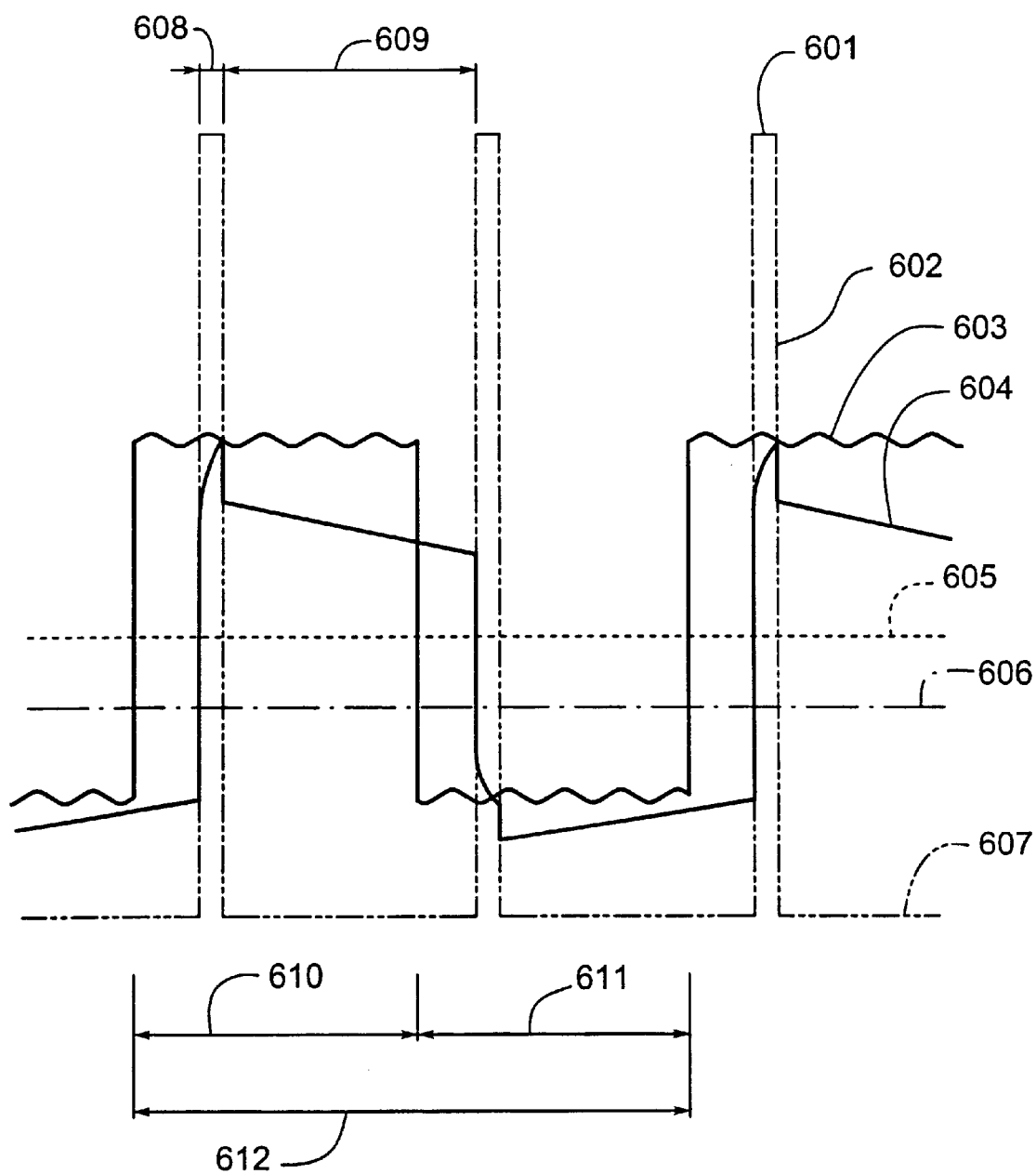
FIG. 6 is a graph illustrating the waveforms of driving signals used in a TFT type liquid crystal device.
Figure 7:
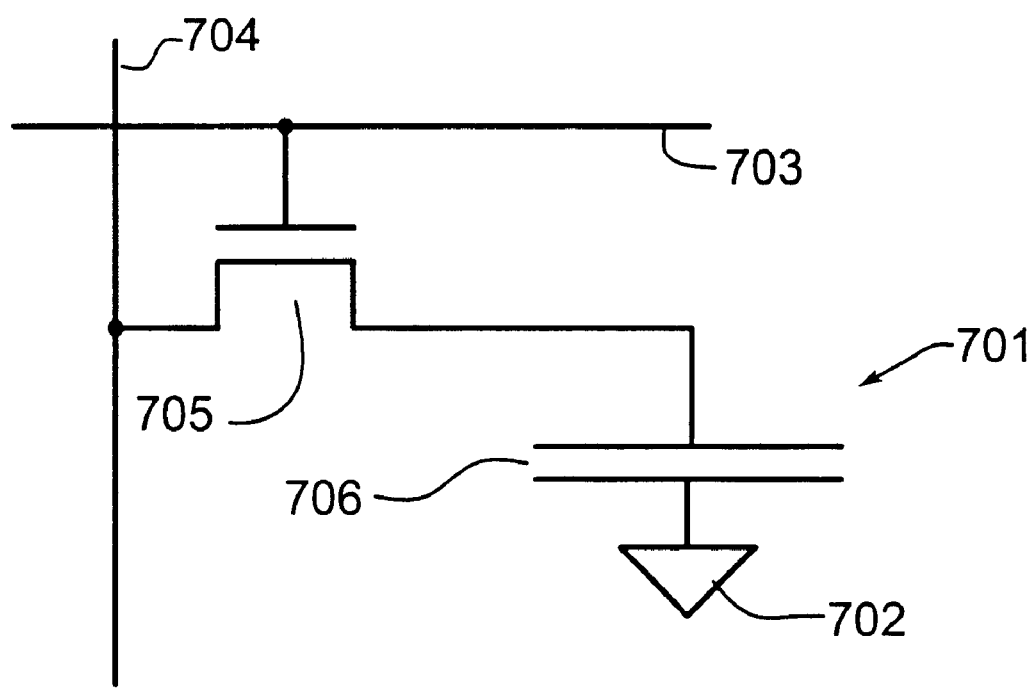
FIG. 7 is a circuit diagram illustrating an equivalent circuit of one pixel of the liquid crystal device according to the present invention.

Referring now to FIGS. 6 and 7, a method of driving the active matrix liquid crystal device is described below. FIG. 7 is a circuit diagram illustrating an equivalent circuit of one pixel of the liquid crystal device. FIG. 6 illustrates the waveform of driving signals. In FIG. 7, reference numeral 703 denotes a scanning signal line corresponding to 503 in FIG. 5, reference numeral 704 denotes an image signal line corresponding to 504 in FIG. 5, and reference numeral 705 denotes a thin film transistor corresponding to 505 in FIG. 5. The gate electrode of the thin film transistor 705 is connected to the scanning signal line 503, the source electrode is connected to the image signal line 704, and the drain electrode is connected to the pixel electrode 701 corresponding to 501 in FIG. 5 (112 in FIG. 1). Reference numeral 706 denotes a liquid crystal capacitor. Reference numeral 702 denotes a common electrode corresponding to 502 in FIG. 5 (111 in FIG. 1). FIG. 6 illustrates the signals for driving one pixel as a function of time. In FIG. 6, reference numeral 607 denotes a scanning signal applied over the scanning signal line, reference numeral 608 denotes a selection period during which the thin film transistor is turned on, and reference numeral 609 denotes a non-selection period during which the thin film transistor is turned off and the liquid crystal is held at the voltage applied in the previous selection period. During the selection period 608, the image signal 603 supplied over the image signal line is applied to the pixel electrode via the thin film transistor. Reference numeral 612 denotes one frame period, reference numeral 610 denotes a first field, and reference numeral 611 denotes a second field. The image signal 603 is inverted in polarity at the transition between the first and second fields in such a manner that the image signal during the second field becomes opposite to that during the first field about the amplitude center voltage 605 of the image signal. Reference numeral 604 denotes the voltage on the pixel electrode, and the difference between the voltage on the pixel electrode and the voltage on the common voltage is applied across the liquid crystal. During the selection period 608, the image signal 606 is applied to the pixel electrode via the thin film transistor, and thus the voltage on the pixel electrode becomes equal to the image signal 606. However, during the selection period 608, a charge is stored in a parasitic capacitor between the drain and gate electrodes of the thin film transistor, and this charge flows into the pixel electrode during the non-selection period 609. This causes a reduction in the voltage of the pixel electrode by an amount of $\Delta V$. To compensate for the above-described voltage reduction, the voltage 606 of the common electrode is lowered by an amount of $\Delta V$ from the amplitude center voltage 605 of the image signal. Thus, the voltage of the pixel electrode is inverted in polarity every field such that the positive and negative signals are substantially symmetric to each other about the voltage of the common electrode. An additional storage capacitor may be formed in the pixel area in such a manner that the storage capacitor is connected in parallel to the liquid crystal capacitor 706. The storage capacitor may be formed in the periphery of the pixel area shown in FIG. 5 by making an overlap between the pixel electrode 501 and the common electrode 502 via the insulating film.

Figure 8A:
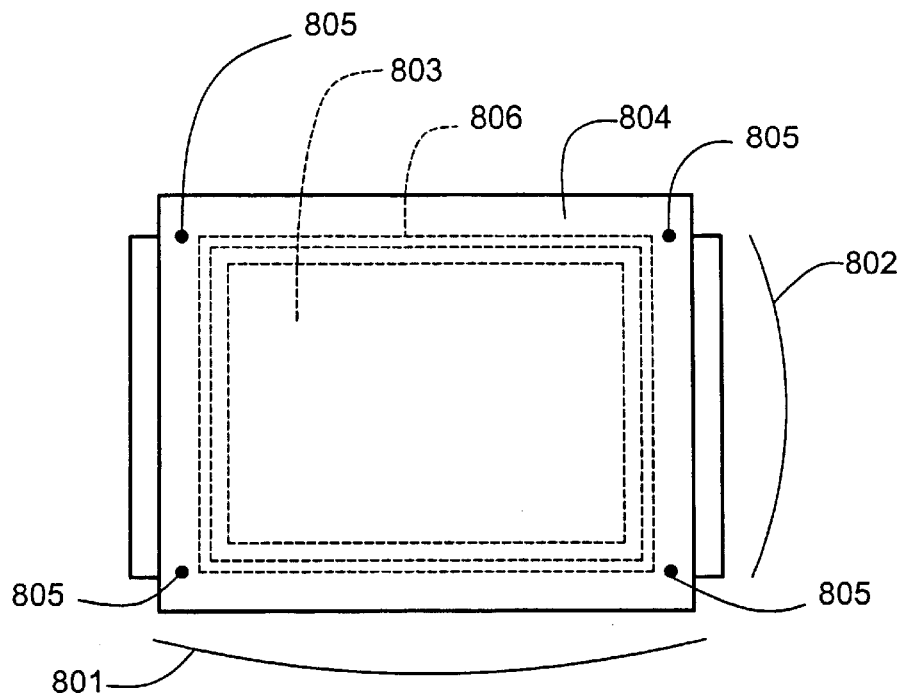
FIG. 8 illustrates a liquid crystal cell in which electrodes on the inner surfaces of the upper and lower substrates are electrically connected to each other via a silver paste, according to the present invention, wherein a plane view and an enlarged cross-sectional view thereof are shown.
Figure 8B:
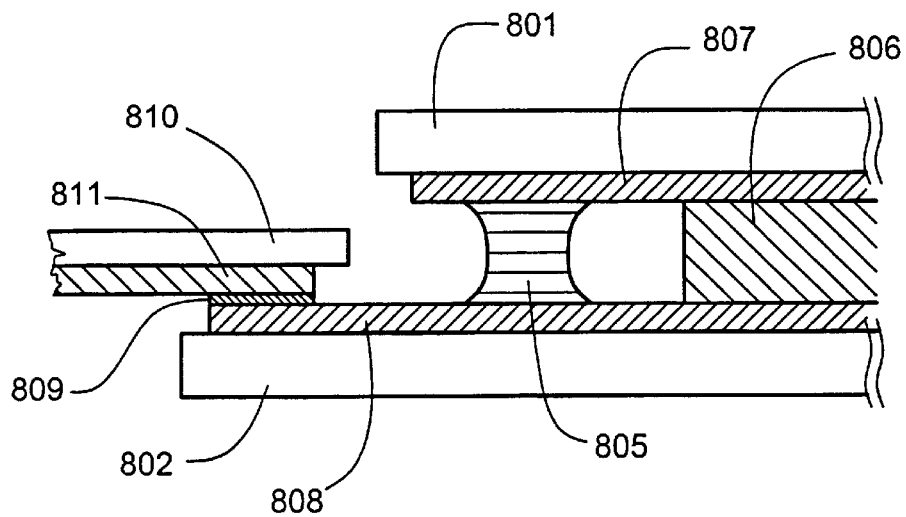

In the liquid crystal device according to the present embodiment, as shown in FIG. 8, the light-shielding chromium film 807 (101 in FIG. 1) of the upper glass substrate 801 (104 in FIG. 1) is electrically connected via a silver paste 805 to the common electrode 808 (111 in FIG. 1) formed on the lower glass substrate 802 (109 in FIG. 1) so that they are maintained at the same voltage. FIG. 8a is a plane view of the liquid crystal panel and FIG. 8b is an enlarged cross-sectional view illustrating a part in which the upper and lower substrates are electrically connected to each other via the silver paste. In FIG. 8, the light-shielding chromium film shields such areas between the thin film transistors and the pixels in the pixel area 803. The light-shielding film may also have a part in the periphery 804 wherein it extends between the seal element 806 and the pixel area 803 and extends around the pixel area 803 so that such the part of the light-shielding chromium film serves to part the pixel area.

The light-shielding film 807 (101) extending outside the sealing area in the periphery 804 are electrically connected to the common electrode 808 (111) extending from the pixel area, via a silver paste 805 at four points outside the sealing area 806 of the liquid crystal (wherein the sealing area is located around the pixel area 803 and serves to seal the pair of substrates). The reason for making the electrical connections between the light-shielding film and the common electrode at a plurality of points is to obtain an uniform voltage distribution across the light-shielding film over the entire pixel area.

In FIG. 8b, A terminal extending from the common electrode 808 is electrically connected via an anisotropic conducting film 809 to an interconnecting electrode 811 for supplying the common electrode voltage, wherein the interconnecting electrode 811 is formed on a flexible tape 810 which is used to mount a liquid crystal driver circuit or connect the liquid crystal panel to a circuit board.

The liquid crystal device constructed in the above-described manner was subjected to an electrostatic voltage test under application of about 1 kV. Without encountering electrostatic charging, a high-quality image was displayed, and no disturbance in the liquid crystal orientation was observed.

In the liquid crystal device constructed in the above-described manner according to the first embodiment described above, the chromium film serving as the light-shielding metal film is maintained at the fixed voltage (the common electrode voltage). This ensures that the color filter substrate is prevented from being electrostatically charged and thus a high-quality image can be displayed. If the color filter substrate had no light-shielding metal film maintained at the fixed voltage, the electrostatic charge would produce a great voltage difference between the upper substrate and the pixel electrodes and common electrodes formed on the lower substrate. The liquid crystal would respond to that voltage. Therefore, to achieve a high-quality image, it is important that the light-shielding metal film be formed on the color filter substrate having no electrode for driving the liquid crystal and be maintained at a fixed voltage. In the present embodiment, since the light-shielding metal film is maintained at the common electrode voltage which exists in the liquid crystal device, there is no need to produce an additional voltage and therefore the anti-electrostatic charge measure can be taken at low cost.

(Second Embodiment)

Figure 9:
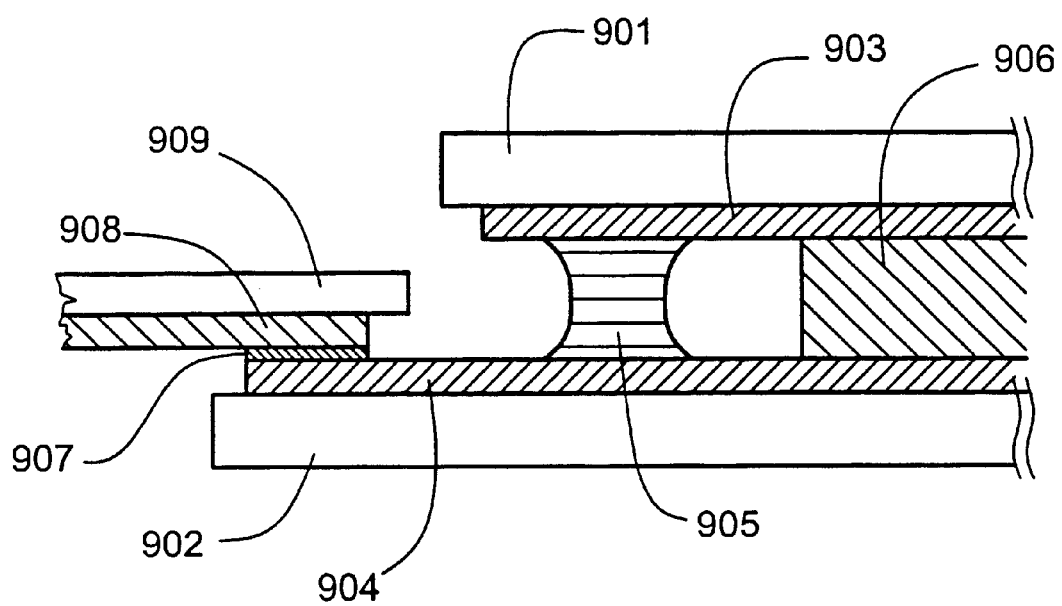
FIG. 9 is a cross-sectional view illustrating a liquid crystal cell in which electrodes on the inner surfaces of the upper and lower substrates are electrically connected to each other via a silver paste, according to the present invention.

In this second embodiment, as shown in FIG. 9, the liquid crystal device has a similar structure to that employed in the first embodiment except that the light-shielding chromium film 903 formed on the upper glass substrate (101 in FIG. 1) is grounded. The structure of the liquid crystal device is described in further detail below with reference to FIG. 9. FIG. 9a is a plane view of a liquid crystal panel, and FIG. 9b is an enlarged cross-sectional view illustrating a part in which an electric connection between the upper and lower substrates is made via a silver paste. The light-shielding chromium film 903 formed on the inner surface of the upper substrate 901 (104 in FIG. 1) is connected to a dummy electrode 904 formed on the inner surface of the lower substrate 902 (109 in FIG. 1) wherein the connection is made via the silver paste 905 and at a point outside the seal area 906. As shown in FIG. 9b, the dummy electrode 904 is electrically connected via an anisotropic conducting film (ACF) 907 to an interconnecting electrode 908 for supplying the ground voltage, wherein the interconnecting electrode 908 is formed on a flexible circuit board for mounting a liquid crystal driver thereon or for electrically connecting the liquid crystal panel to a circuit board, thereby connecting the dummy electrode 904 to a ground voltage line provided on the liquid crystal driver circuit board. The liquid crystal device constructed in the above-described manner was subjected to an electrostatic voltage test under an application of about 1 kV. Without encountering electrostatic charging, a high-quality image was displayed, and no disturbance in the liquid crystal orientation was observed.

In the liquid crystal device constructed in the above-described manner according to the second embodiment described above, the chromium film serving as the light-shielding metal film is maintained at the fixed voltage (the ground voltage). This ensures that the color filter substrate is prevented from being electrostatically charged and thus a high-quality image can be displayed.

If the light-shielding chromium film is maintained at the ground voltage, a slight voltage difference can occur between the light-shielding chromium film and the pixel electrode or the common electrode. However, because the color filter layer and the orientating film exist on the light-shielding chromium film, the slight voltage difference is further decreased by a voltage drop in the color filter layer and the orientating film. Therefore, the voltage difference actually applied to the liquid crystal is small enough and it can be neglected. If there were no light-shielding chromium film maintained at a fixed voltage, as high a voltage as a few ten thousand voltages would be applied to the liquid crystal when the color filter substrate was electrostatically charged, and the liquid crystal device would no longer operate properly. Therefore, to achieve a high-quality image, it is important that the light-shielding metal film be formed on the color filter substrate having no electrode for driving the liquid crystal and be maintained at the fixed voltage (ground voltage). Since the ground voltage is already present in the liquid crystal device, there is no need to produce an additional voltage and therefore a liquid crystal device having strong resistance to electrostatic charges can be realized at low cost.

(Third Embodiment)

In this third embodiment, the liquid crystal device has a similar structure to that employed in the first embodiment except that the light-shielding chromium film formed on the upper glass substrate is connected to the amplitude center voltage (605 in FIG. 6) of the image signal. The connection is made in the same manner as shown in FIG. 9, and the dummy electrode 904 is connected to a voltage line for supplying the amplitude center voltage of the image signal wherein the voltage line is formed on a flexible circuit board 909 mounted on the liquid crystal panel. The liquid crystal device constructed in the above-described manner was subjected to an electrostatic voltage test under an application of about 1 kV. Without encountering electrostatic charging, a high-quality image was displayed, and no disturbance in the liquid crystal orientation was observed.

In the liquid crystal device constructed in the above-described manner according to the third embodiment described above, the chromium film serving as the light-shielding metal film is maintained at the fixed voltage (the amplitude center voltage of the image signal). For the same reason as that in the first and second embodiments, the color filter substrate is prevented from being electrostatically charged and a high-quality image can be obtained. Since the common electrode voltage is already present in the liquid crystal device, there is no need to produce an additional voltage.

(Fourth Embodiment)

In this fourth embodiment, the liquid crystal device has a similar structure to that employed in the first embodiment except that the non-selection voltage supplied via the scanning signal line (503 in FIG. 5) is applied to the light-shielding chromium film formed on the upper glass substrate (wherein the non-selection voltage is supplied over the scanning signal line 607 in FIG. 6 during the non-selection period 609). The connection is made in the same manner as shown in FIG. 9, and the dummy electrode 904 is connected to a voltage line for supplying the non-selection voltage via the scanning signal line formed on the flexible circuit board 909 mounted on the liquid crystal panel. The liquid crystal device constructed in the above-described manner was subjected to an electrostatic voltage test under application of about 1 kV. Without encountering electrostatic charging, a high-quality image was displayed, and no disturbance in the liquid crystal orientation was observed.

In the liquid crystal device constructed in the above-described manner according to the fourth embodiment described above, the chromium film serving as the light-shielding metal film is maintained at the fixed voltage (the non-selection voltage of the scanning signal). For the same reason as that in the first and second embodiments, the color filter substrate is prevented from being electrostatically charged and a high-quality image can be achieved. Since the non-selection voltage of the scanning signal is already present in the liquid crystal device, there is no need to produce an additional voltage.

(Fifth Embodiment)

In this fifth embodiment, the liquid crystal device has a similar structure to that employed in the first embodiment except that the light-shielding chromium film formed on the upper glass substrate is connected to the logic voltage generated in the liquid crystal driver circuit. The connection is made in the same manner as shown in FIG. 9, and the dummy electrode is connected to a logic voltage line formed on the flexible circuit board 909 mounted on the liquid crystal panel. The liquid crystal device constructed in the above-described manner was subjected to an electrostatic voltage test under an application of about 1 kV. Without encountering electrostatic charging, a high-quality image was displayed, and no disturbance in the liquid crystal orientation was-observed.

In the liquid crystal device constructed in the above-described manner according to the fifth embodiment described above, the chromium film serving as the light-shielding metal film is maintained at the fixed voltage (the logic voltage). For the same reason as that in the first and second embodiments, the color filter substrate is prevented from being electrostatically charged and a high-quality image can be achieved. Since the logic voltage is already present in the liquid crystal device, there is no need to produce an additional voltage. Although a chromium film is employed as the light-shielding film in this fifth embodiment, it has been confirmed experimentally that a film of metal other than Cr, such as Ta, Al, Au, may also be employed for the same purpose.

(Sixth Embodiment)

Figure 2A:
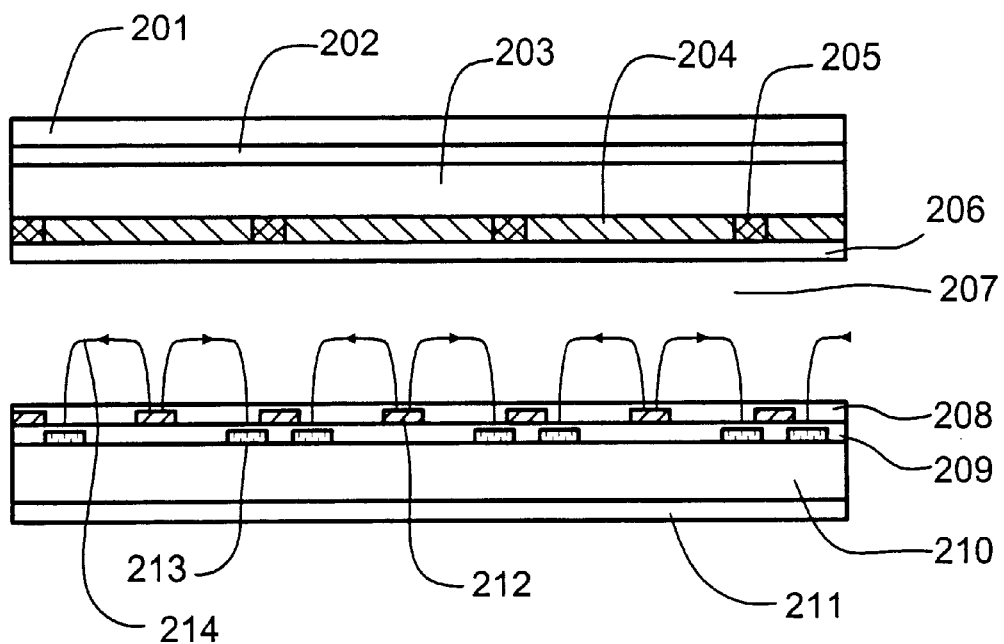
FIG. 2 is a cross-sectional view of the liquid crystal device according to the present invention.

FIG. 2a is a schematic diagram illustrating a main part of a liquid crystal device according to the sixth embodiment of the invention. The structure is described first. Two transparent glass substrates 203 and 210 with a thickness of 1.1 mm are disposed in close proximity to each other, and a liquid crystal layer 207 is disposed between them. A red/green/blue (RGB) color filter 204, a light-shielding resin film 205, and an orientating film 206 are formed one on another on the inner surface of the upper glass substrate 203. A transparent conducting ITO film 202 and a polarizing plate 201 are formed on the outer surface of the upper glass substrate 203. Common electrodes 213, an insulating layer 209, pixel electrodes 212 and an orientating film 208 are formed on the inner surface of the lower glass substrate 210, and a polarizing plate 211 is formed on the outer surface.

As described earlier with reference to the plane view of the lower glass substrate shown in FIG. 5, scanning signal lines (gate lines) 503 and image signal lines (source lines) 504 extend in a matrix form across the respective pixels. Thin film transistors (TFTs) 505 are formed near the respective intersections of the scanning signal lines 503 and the image signal lines 504, wherein the gate electrodes of the respective thin film transistors are connected to the corresponding scanning signal lines 503, the source electrodes to the corresponding image signal lines 504, and the drain electrodes to the corresponding pixel electrodes 501 (212). In this sixth embodiment, the driving is performed in the same manner as in the first embodiment.

In FIG. 2, the common electrode 213 and the pixel electrode 212 in one pixel are located in different layers separated by the insulating layer 209. In FIG. 2a, lines 214 denote the direction of the electric field. In this embodiment, the gap between the upper and lower substrates, the distance between electrodes, and the rubbing direction are slightly different from those employed in the first embodiment. That is, in this sixth embodiment, the upper and lower substrates were spaced by 4.0 μm, and a nematic liquid crystal having positive dielectric anisotropy and having anisotropy in refractive index Δn=0.070 was employed as the liquid crystal material 207. The line-shaped common electrodes 213 and the pixel electrodes 212 were spaced by 15 μm wherein the width was set to 5 μm for both electrodes. A rubbing orientation process was performed so that the longitudinal axes of the liquid crystal molecules were aligned at 45° with respect to the longitudinal direction of the line-shaped electrodes (common electrodes 213, pixel electrodes 212). The polarizing plate 201 on the upper glass substrate 203 was disposed such that its absorption axis became parallel to the orientation of the liquid crystal. On the other hand, the polarizing plate 211 on the lower glass substrate 210 was disposed such that its absorption axis became perpendicular to the orientation of the liquid crystal. In this state, black is displayed in the pixel. The orientation angle of the liquid crystal molecules varies in response to a voltage applied from external driving means. Thus, it is possible to control the brightness by changing the applied voltage. Below the lower substrate 210, there is provided a back light source.

As shown in FIG. 2a, the light-shielding film 205 is disposed so that the areas in which the thin film transistors, the image signal lines, and the scanning signal lines formed on the lower substrate are shielded from light.

In the present embodiment, the transparent conducting ITO film 202 formed on the upper glass substrate 203 is connected to the ground voltage via an electric interconnection passing through an area other than the pixel area.

Figure 3:
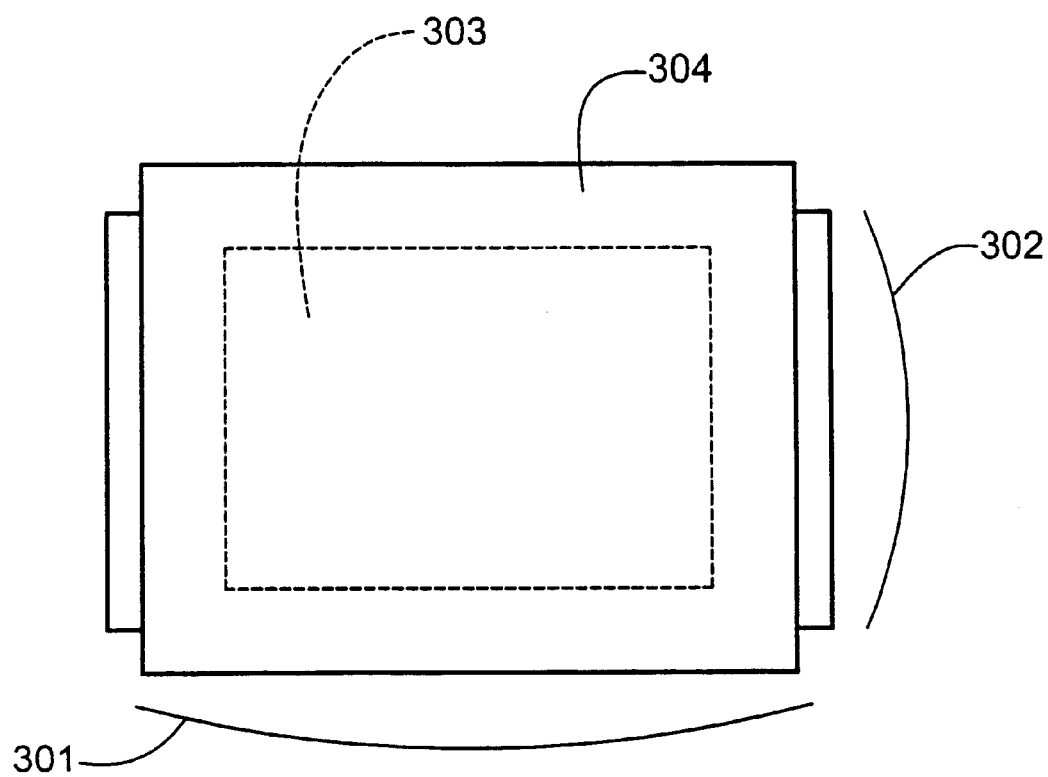
FIG. 3 is a plane view of a liquid crystal cell according to the present invention.

FIG. 3 is a plane view illustrating a liquid crystal panel. In FIG. 3, reference numeral 302 denotes the lower substrate (corresponding to 210 in FIG. 2a), 301 denotes the upper substrate (203 in FIG. 2a), 303 denotes the pixel area, and 304 denotes the periphery of the pixel area. In the present embodiment, the transparent conducting film 202 is formed on the outer surface of the upper substrate, in the area including the pixel area 303 and its periphery 304.

The connection of the transparent conducting film and to the ground voltage may be made as follows. The transparent conducting film is exposed at the end of the periphery and the exposed portion is contacted or connected via a connection member to a metal enclosure (not shown) so that the transparent conducting film is maintained at a fixed voltage (ground voltage). If the metal enclosure is maintained at a fixed voltage (ground voltage), the enclosure itself has the electrostatic shielding capability. This further ensures that the liquid crystal device is protected from electrostatic charges. The manner of connecting the transparent conducting film to the ground voltage is not limited to the above specific method, but the connection may be realized in various fashions.

The liquid crystal device constructed in the above-described manner was subjected to an electrostatic voltage test under an application of about 1 kV.

Without encountering electrostatic charging, a high-quality image was displayed. In the liquid crystal device constructed in the above-described manner according to the sixth embodiment described above, the color filter substrate is prevented from being electrostatically charged and thus it is possible to display a high-quality image. Since the ground voltage is already present in the liquid crystal device, there is no need to produce an additional voltage.

Although in the present embodiment the transparent conducting ITO film is maintained at the ground voltage, it may also be maintained, as in the second through fifth embodiment, at another voltage such as the common electrode voltage, the center voltage of the image signal amplitude, the non-selection voltage of the scanning signal, or the logic voltage provided from an external driving means. Furthermore, instead of the ITO film, other materials such as $SnO_2$ may also be employed to form the transparent conducting film. It is not necessarily required that the transparent conducting film be formed over the entire area of the upper substrate, but it may be formed in a partial fashion.

(Seventh Embodiment)

In this seventh embodiment, the transparent conducting ITO film formed on the upper substrate in the sixth embodiment described above is replaced by a chromium film, wherein the chromium film is formed in the peripheral area 304 other than the pixel area 303. The chromium film formed on the upper glass substrate is maintained at the ground voltage. The chromium film in the peripheral area 304 may also serve as a parting plate for shielding the periphery of the pixel area 303 from light. As in the sixth embodiment, the chromium film may be connected to any voltage selected from various voltages available. The liquid crystal device constructed in the above-described manner was subjected to an electrostatic voltage test under an application of about 1 kV. Without encountering electrostatic charging, a high-quality image was displayed, and no disturbance in the liquid crystal orientation was observed.

In the liquid crystal device constructed in the above-described manner according to the seventh embodiment described above, the color filter substrate is prevented from being electrostatically charged and thus a high-quality image can be displayed. Since the common electrode voltage is already present in the liquid crystal device, there is no need to produce an additional voltage.

Although in the present embodiment the chromium is maintained at the ground voltage, it may also be maintained at another voltage such as the common electrode voltage, the center voltage of the image signal, the non-selection voltage of the scanning signal, or the logic voltage provided from an external driving means. A high-quality image can be obtained regardless of which voltage the chromium film is maintained at.

Although in the present embodiment the chromium film is formed on the outer surface of the liquid crystal panel substrate, in the area except for the pixel area, the chromium film may also be forming in the peripheral area of the inner surface of the liquid crystal panel substrate (wherein the thin film transistors and the areas between pixels in the pixel area are shielded by the light-shielding resin film, in the present embodiment).

Although a chromium film is employed in the present embodiment, it has been confirmed experimentally that a film of metal other than Cr, such as Ta, Al, Au, may also be employed for the same purpose.

(Eighth Embodiment)

This eighth embodiment is obtained by modifying the structure employed in the sixth embodiment described above with reference to FIG. 2a. In this eighth embodiment, the upper and lower substrates were spaced by 4.0 μm, and a nematic liquid crystal having positive dielectric anisotropy and having anisotropy in refractive index Δn=0.070 was employed as the liquid crystal material 207. The line-shaped common electrodes 213 and the pixel electrodes 212 were spaced by 15 μm wherein the width was set to 10 μm for both electrodes. A rubbing orientation process was performed so that the longitudinal axes of the liquid crystal molecules were aligned at 45° with respect to the longitudinal direction of the line-shaped electrodes (common electrodes 213, pixel electrodes 212). The polarizing plate 201 on the upper glass substrate 203 was disposed such that its absorption axis became parallel to the orientation of the liquid crystal. On the other hand, the polarizing plate 211 on the lower glass substrate 210 was disposed such that its absorption axis became perpendicular to the orientation of the liquid crystal. In this state, black is displayed in the pixel. The orientation angle of the liquid crystal molecules varies in response to a voltage applied from external driving means. Thus, it is possible to control the brightness by changing the applied voltage. Below the lower substrate 210, there is provided a back light source.

In the present embodiment, the transparent conducting ITO film 202 formed on the upper glass substrate 203 is not connected to any part and it is maintained in an electrically floating state.

The liquid crystal device constructed in the above-described manner was subjected to an electrostatic voltage test under an application of about 1 kV. Without encountering electrostatic charging, a high-quality image was displayed.

In the liquid crystal device constructed in the above-described manner according to the eighth embodiment described above, the color filter substrate is prevented from being electrostatically charged and thus a high-quality image can be displayed. Furthermore, since the voltage of the transparent conducting film is maintained in the electrically floating state, no electric connection is needed. This makes it possible to take the anti-electrostatic charge measure at low cost.

(Ninth Embodiment)

Figure 2B:
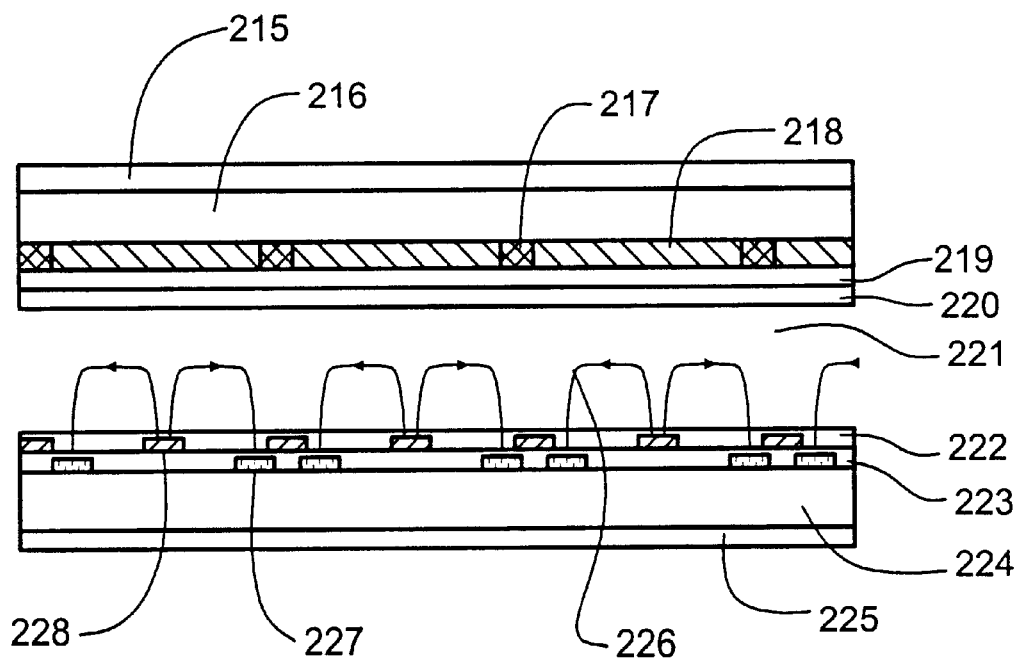

FIG. 2b is a schematic diagram illustrating a main part of a liquid crystal device according to the sixth embodiment of the invention. The structure is described first. Two transparent glass substrates 216 and 224 with a thickness of 1.1 mm are disposed in close proximity to each other, and a liquid crystal layer 221 is disposed between them. A red/green/blue (RGB) color filter 218, a light-shielding resin film 217, a transparent conducting ITO film 219, and an orientating film 220 are formed one on another on the inner surface of the upper glass substrate 216, and a polarizing plate 215 is disposed on the outer surface of the upper glass substrate 216. Common electrodes 227, an insulating layer 223, pixel electrodes 228, and an orientating film 222 are formed on the inner surface of the lower glass substrate 224, and a polarizing plate 225 is disposed on the outer surface of the lower glass substrate 224.

As described earlier with reference to the plane view of the lower glass substrate shown in FIG. 5, scanning signal lines (gate lines) 503 and image signal lines (source lines) 504 extend in a matrix form across the respective pixels. Thin film transistors (TFTs) 505 are formed near the respective intersections of the scanning signal lines 503 and the image signal lines 504, wherein the drain electrodes of the respective thin film transistors are connected to the corresponding pixel electrodes 501 (228). In this ninth embodiment, the driving is performed in the same manner as in the first embodiment.

The common electrode 227 and the pixel electrode 228 in one pixel are located in different layers separated by the insulating layer 223. In FIG. 2b, lines 226 denote the direction of the electric field. In this embodiment, the gap between the upper and lower substrates, the anisotropy of refractive index, the distance between electrodes, and the rubbing direction are slightly different from those employed in the first embodiment. That is, the upper and lower substrates were spaced by 4.0 μm, and a nematic liquid crystal having positive dielectric anisotropy and having anisotropy in refractive index Δn=0.085 was employed as the liquid crystal material 221. The line-shaped common electrodes 227 and the pixel electrodes 228 were spaced by 12 μm wherein the width was set to 5 μm for both electrodes. A rubbing orientation process was performed so that the longitudinal axes of the liquid crystal molecules were aligned at 40° with respect to the longitudinal direction of the line-shaped electrodes (common electrodes 227, pixel electrodes 228). The polarizing plate 215 on the upper glass substrate 216 was disposed such that its absorption axis became parallel to the orientation of the liquid crystal. On the other hand, the polarizing plate 225 on the lower glass substrate 224 was disposed such that its absorption axis became perpendicular to the orientation of the liquid crystal. In this state, black is displayed in the pixel. The orientation angle of the liquid crystal molecules varies in response to a voltage applied from external driving means. Thus, it is possible to control the brightness by changing the applied voltage. Below the lower substrate 224, there is provided a back light source.

As shown in FIG. 2a, the light-shielding film 205 is disposed so that the areas in which the thin film transistors, the image signal lines, and the scanning signal lines formed on the lower substrate are shielded from light.

In the present embodiment, the transparent conducting ITO film 219 formed on the upper glass substrate 216 is not connected to any part and it is maintained in an electrically floating state. The liquid crystal device constructed in the above-described manner was subjected to an electrostatic voltage test under an application of about 1 kV. Without encountering electrostatic charging, a high-quality image was displayed, and no disturbance in the liquid crystal orientation was observed.

In the liquid crystal device constructed in the above-described manner according to the ninth embodiment described above, the color filter substrate is prevented from being electrostatically charged and thus a high-quality image can be displayed. Furthermore, since the voltage of the transparent conducting film is maintained in a floating state, no electrical connection is required. This makes it possible to take the anti-electrostatic charge measure at low cost. In general, if a transparent conducting film is formed on the surface which is in contact with the liquid crystal, that is, in the inside of a liquid crystal cell, a voltage difference occurs between the transparent conducting film and the pixel electrode and/or the common electrode. As a result, degradation in the image quality occurs. However, in the present technique, since the voltage of the conductive film is maintained in the floating state, the degradation in the image quality is suppressed.

Although in this embodiment the transparent conducting ITO film is formed between the color filter layer and the orientating film on the upper substrate, it may also be formed between the substrate and the color filter layer.

(Tenth Embodiment)

In this embodiment, the light-shielding resin film 205 or 217 employed in the eighth or ninth embodiment described above with reference to FIG. 2 is replaced by a light-shielding film made up of metal such as chromium. The light-shielding metal film is used not only to shield the thin film transistors and the areas between adjacent pixels from light, but also to provide at periphery of the pixel area an electrical connection for supplying a fixed voltage as described above with reference to the first embodiment through the fifth embodiment in conjunction with FIG. 8.

Alternatively, a transparent conductive ITO film in an electrically floating state such as that employed in the eighth and ninth embodiments is formed on the outer or inner surface of the upper substrate as shown in FIG. 2 so that the transparent conducting ITO film in the electrically floating state is combined with the light-shielding chromium film.

In this structure, the transparent conducting ITO film in the electrically floating state absorbs electrostatic charges and the light-shielding metal film shields the liquid crystal from electrostatic charges. Therefore, this structure provides higher resistance to electrostatic charges.

However, when the light shielding metal film and the transparent conducting film are formed into a multilayer structure on the inner surface of the upper substrate, it is required that these two layers should be isolated by a color filter or other an insulating film.

Although in the present embodiment the transparent conducting ITO film is formed between the color filter layer and the orientating film on the upper substrate, it may also be formed between the substrate and the color filter layer.

(Eleventh Embodiment)

In this eleventh embodiment, instead of the transparent conducting ITO film employed in the liquid crystal device according to the eighth or ninth embodiment, a chromium film is formed on the outer or inner surface of the upper glass substrate, in the periphery 304 of the pixel area 303 as shown in FIG. 3. The voltage of the chromium film formed on the upper glass substrate is maintained in a floating state.

The liquid crystal device constructed in the above-described manner was subjected to an electrostatic voltage test under an application of about 1 kV. Without encountering electrostatic charging, a high-quality image was displayed, and no disturbance in the liquid crystal orientation was observed.

In the liquid crystal device constructed in the above-described manner according to the eleventh embodiment described above, the color filter substrate is prevented from being electrostatically charged and thus a high-quality image can be displayed. Furthermore, since the voltage of the chromium film is maintained in the floating state, no electrical connection is required. This makes it possible to take the anti-electrostatic charge measure at low cost. Furthermore, the light-shielding film may also serve to part the pixel area.

In the present embodiment of the invention, as described above, it is possible to realize a liquid crystal device capable of displaying a high-quality image without encountering significant influence of electrostatic charges.

(Twelfth Embodiment)

In this twelfth embodiment, the upper polarizing plate 103, 201, or 215 shown in FIG. 1b, 2a or 2b is modified to have electrical conductivity. Such a polarizing plate may be easily realized by mixing conductive particles in a film material used to form the polarizing plate or by bonding a transparent conducting film to a polarizing film.

The conductive polarizing plate may be maintained either in an electrically floating state or at a particular fixed voltage (such as the common electrode voltage, ground voltage, non-selection scanning signal voltage, logic voltage supplied from an external driving means). When the conductive polarizing plate is maintained at a fixed voltage, the polarizing plate or the conductive polarizing plate is exposed and it is connected to the fixed voltage in a similar manner to that employed in the sixth embodiment.

The liquid crystal device constructed in the above-described manner was subjected to an electrostatic voltage test under an application of about 1 kV. Without encountering electrostatic charging, a high-quality image was displayed, and no disturbance in the liquid crystal orientation was observed.

In the liquid crystal device of the present embodiment, the color filter substrate is prevented from being electrostatically charged and thus a high-quality image can be displayed.

In addition to the upper polarizing plate, the lower polarizing plate may also be formed into the conductive fashion so that the liquid crystal panel is disposed between the upper and lower conductive polarizing plates thereby achieving higher resistance to electrostatic charges.

The technique of the present embodiment may be combined with any technique disclosed above in the first through eleventh embodiments so as to realize a liquid crystal panel having higher resistance to electrostatic charges.

(Thirteenth Embodiment)

An electronic equipment using a liquid crystal device based on any technique disclosed above in the first through twelfth embodiments is described below.

Figure 10:
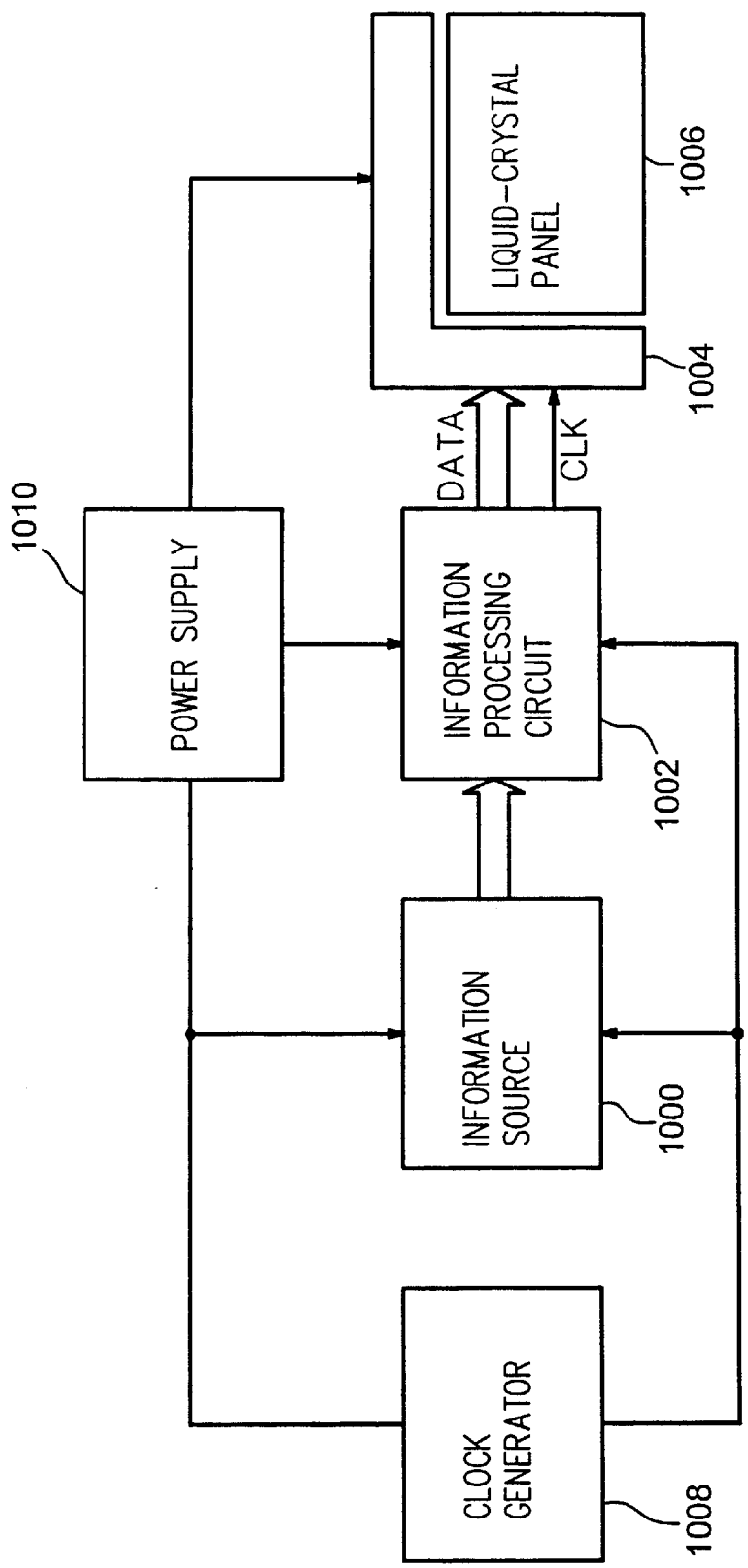
FIG. 10 is a block diagram illustrating a driving circuit of driving a liquid crystal device, according to the present invention.

As shown in FIG. 10, this electronic equipment using a liquid crystal display device includes an information source 1000 for generating information to be displayed, a processing circuit 1002 for processing the information to be displayed, a driving circuit 1004 for driving the display panel, a display panel 1006 such as a liquid crystal panel, a clock generator 1008, and a power supply 1010. The information source 1000 for generating information to be displayed includes a memory such as ROM and RAM, and a tuner circuit for selecting a desired television signal and outputting the selected signal. In response to the clock signal generated by the clock generator 1008, the information source 1000 outputs information such as a video signal to be displayed. The processing circuit 1002 processes the information to be displayed in response to the clock signal generated by the clock generator 1008, and outputs the resultant signal. The processing circuit 1002 includes for example an amplifier, an inverter, a phase developing circuit, a rotating circuit, a gamma correction circuit, and a clamping circuit. The driving circuit 1004 for driving the liquid crystal panel 1006 includes a scanning driver circuit and a data driver circuit. The power supply 1010 supplies electric power to the respective circuit elements described above.

Figure 11:
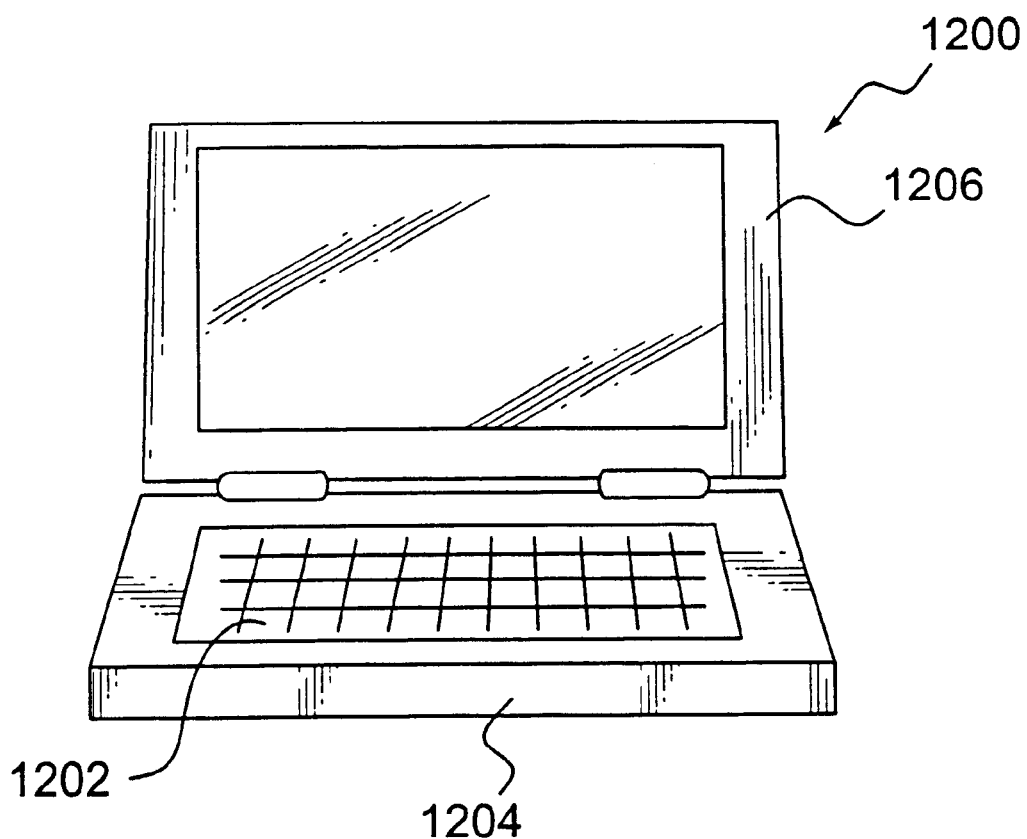
FIG. 11 is a schematic diagram illustrating a personal computer using a liquid crystal device according to the present invention.
Figure 12:
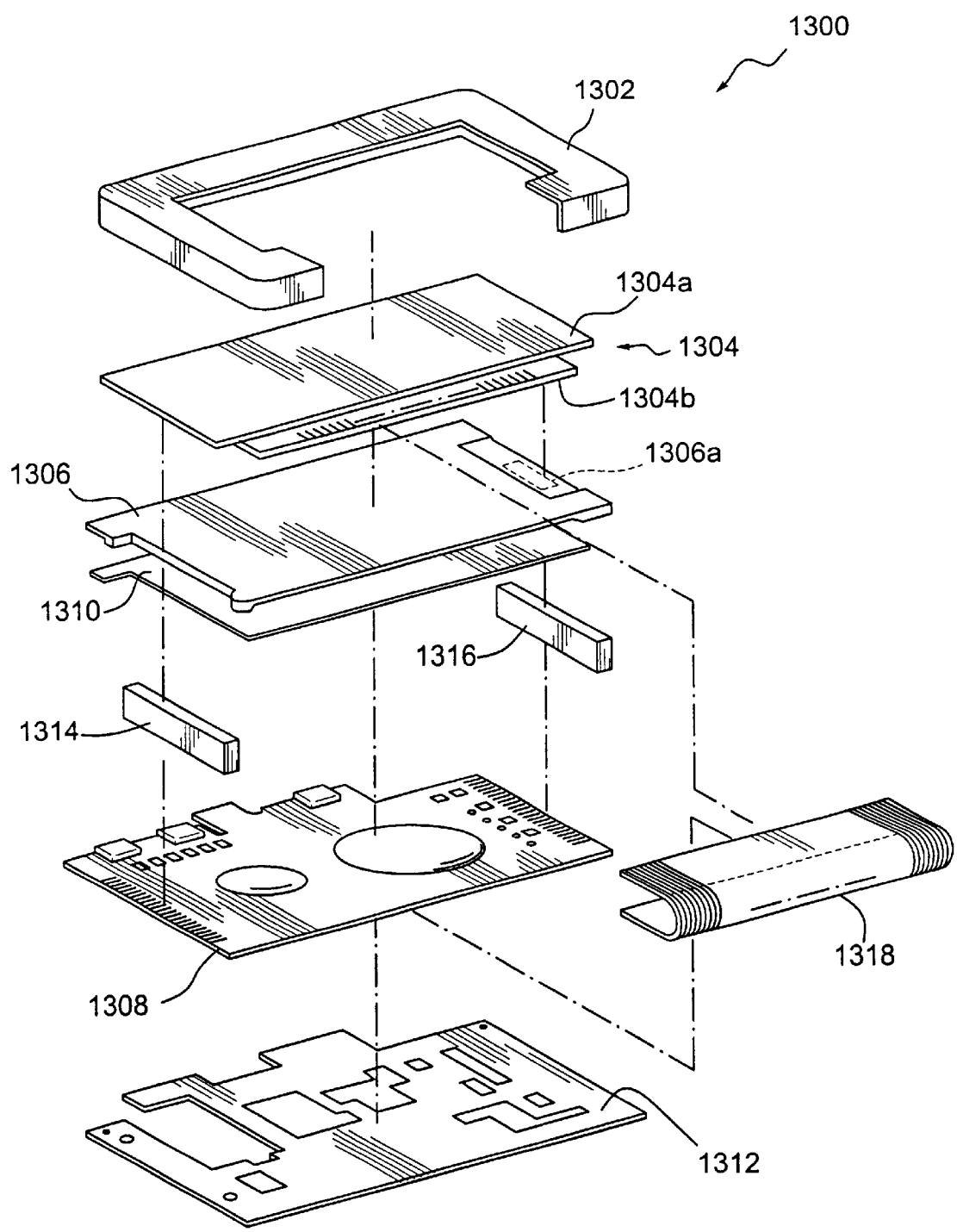
FIG. 12 illustrates an example of the structure of a pager using a liquid crystal device according to the present invention.

Specific examples of an electronic equipment include a personal computer(PC) capable of handling multimedia data or an engineering work station (EWS) such as that shown in FIG. 11, a pager such as that shown in FIG. 12, and a portable telephone, a word processor, a television receiver, a video tape recorder with a view-finder or a monitor display, a pocket-sized electronic notebook, a calculator, a car navigation system, a POS terminal, and other devices with a touch panel.

The personal computer 1200 shown in FIG. 11 consists of a main part 1204 including a key board 1202 and a liquid crystal display 1206. The pager 1300 shown in FIG. 12 consists of a metal frame 1302 and other elements located inside the metal frame 1302, including a glass substrate 1304, a light guide 1306 with a back light 1306*a*, a circuit board 1308, first and second shield plates 1310 and 1312, two elastic conductors 1314 and 1316, and a film carrier tape (flexible substrate) 1318. The two elastic conductors 1314 and 1316 and the film carrier tape 1318 are used to connect the glass substrate 1304 to the circuit board 1308.

The liquid crystal display panel 1304 consists of two transparent plates 1304*a* and 1304*b* and a liquid crystal sealed between these transparent plates thereby forming at least a liquid crystal display panel. On one of the transparent plates, there may be a driving circuit 1004 and also an information processing circuit 1002, such as those shown in FIG. 10. Other circuits which cannot be mounted on the liquid crystal display panel 1304 may be disposed externally for example on the circuit board 1308 as shown in FIG. 12.

Figure 13:
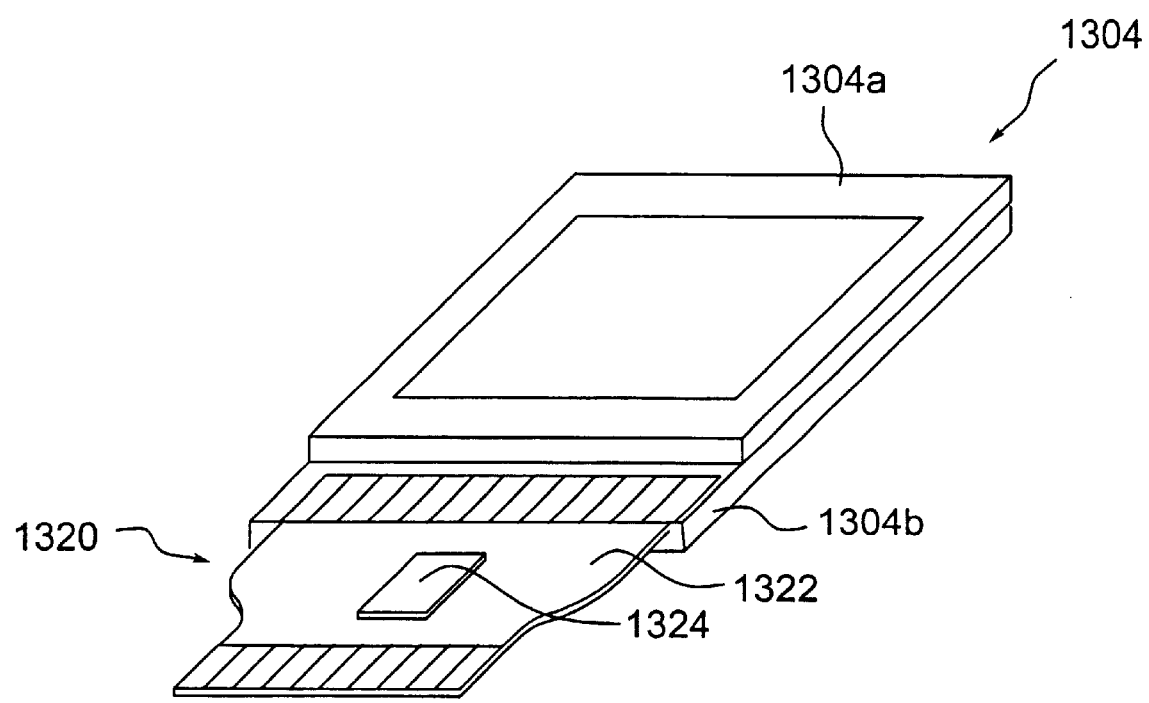
FIG. 13 is a schematic diagram illustrating an example of a practical manner in which a liquid crystal device according to the present invention is mounted.

In the case of a pager such as that shown in FIG. 12, a circuit board 1308 is needed in addition to a glass substrate 1304. However, in general applications in which a liquid crystal display panel is used as an electronic component, a liquid crystal panel having the above structure 1304 can be used as an unit component. A substrate 1304 may be disposed in a metal frame 1302 serving as a case, and the resultant structure may be used as an electronic component functioning as a liquid crystal display device. Furthermore, in the case of the back light type, a liquid crystal display device may be constructed by disposing a substrate 1304 and a light guide 1306 including a back light 1306*a* in a metal frame 1302. FIG. 13 illustrates another example of an electronic component functioning as a liquid crystal display device. In this case, a substrate 1304 is formed with two transparent substrates 1304*a* and 1304*b*, and a TCP (tape carrier package) 1320 is connected to one of the transparent substrates. The TCP 1320 includes a polyimide tape 1322 on which a metal interconnection conducting film is formed.

Although the present invention is described above with reference to preferred embodiments, the invention is not limited to those embodiments. Various modifications may be made without departing from the spirit and scope of the invention.

In connection with the techniques disclosed in the first through twelfth embodiments, various fixed voltages are supplied from the power supply 1010 shown in FIG. 10 to the liquid crystal device. The fixed voltage applied to the light-shielding film or the transparent conducting film may be supplied from the above power supply or the driving circuit 1004. As described earlier with reference to specific embodiments, the light-shielding film is connected to the common electrode or the dummy electrode. The common electrode or the dummy electrode may be connected to a proper fixed voltage via a tape 1318 shown in FIG. 12 or a tape 1322 shown in FIG. 13.

When a fixed voltage is applied to the transparent conductive film or a metal film formed on the outer surface of the upper glass substrate, the fixed voltage may be supplied from the power supply 1010 shown in FIG. 10 to the frame 1302 shown in FIG. 12 serving as the metal enclosure so that the fixed voltage is applied via the frame 1302 to the transparent conducting film or the metal film formed on the upper substrate 1304*a*.

In the embodiments described above, chromium is employed to form the metal film. Alternatively, Ta, Al, Au, a Cr—Ni alloy, or a Cr—Cu alloy may also be employed for the same purpose. Furthermore, instead of ITO, other materials such as $SnO_2$ may also be employed to form the transparent conducting film. It is not necessarily required that the transparent conducting film be formed over the entire surface but it may be formed in a partial fashion.

Industrial Applicability

As described above, the present invention provides an active matrix type liquid crystal device capable of displaying a high-quality image over a large viewing angle. The liquid crystal device according to the invention may be used as a display device in a wide variety of electronic applications such as a personal computer, work station, etc., and also as a monitor device in a multimedia terminal device, television set, etc. The liquid crystal device according to the invention is particularly useful when it is used in an environment where electrostatic charging often occurs for example in an office where there a large number of electronic apparatus.

What is claimed is:

1. A liquid crystal device inlcuding a pair of substrates, a liquid crystal disposed between said pair of substrates, a first one of the substrates having, thereon, scanning signal lines and image signal lines disposed in a matrix form, an active element connected to each of the scanning signal lines and image signal lines, a pixel electrode connected to the active element, and a common electrode, wherein an electric field is applied across the liquid crystal in a direction substantially parallel to a plane in which said pair of substrates lie, wherein a transparent conducting film is formed on either an inner surface or an outer surface of a second one of said substrates, and the voltage of the transparent conducting film is maintained in a floating state.

2. A liquid crystal device including a pair of substrates, a liquid crystal disposed between said pair of substrates, a first one of the substrates having, thereon, scanning signal lines and image signal lines disposed in a matrix form, an active element connected to each of the scanning signal lines and image signal lines, a pixel electrode connected to the active element, and a common electrode, wherein an electric field is applied across the liquid crystal in a direction substantially parallel to a plane in which said pair of substrates lie, wherein a conductive film is formed on a second one of said substrates, in a periphery of a pixel area on either an inner surface or an outer surface of said, second one of said substrates, and the voltage of the conductive film is maintained in a floating state.

3. A liquid crystal device including a pair of substrates, a liquid crystal disposed between said pair of substrates, a first one of the substrates having, thereon, scanning signal lines and image signal lines disposed in a matrix form, an active element connected to each of the scanning signal lines and image signal lines, a pixel electrode connected to the active element, and a common electrode, wherein an electric field is applied across the liquid crystal in a direction substantially parallel to a plane in which said pair of substrates lie, wherein a polarizing plate having an electrical conductivity is disposed on an outer surface of a second one of said substrates, and voltage of said polarizing plate is maintained in a floating state.

4. Electronic equipment using a liquid crystal display device, said liquid crystal device including a pair of substrates, a liquid crystal disposed between said pair of substrates, a first one of the substrates having, thereon, scanning signal lines and image signal lines disposed in a matrix form, an active element connected to each of the scanning signal lines and image signal lines, a pixel electrode connected to the active element, and a common electrode, wherein an electric field is applied across the liquid crystal in a direction substantially parallel to a plane in which said pair of substrates lie, wherein a conductive film is formed on an inner surface or an outer surface of a second one of said substrates, said conductive film being formed in a periphery of a pixel area, and wherein said electronic equipment includes: an interconnection or frame through which a fixed voltage is applied to said conductive film; and a power supply for supplying said fixed voltage via said interconnection or frame.

5. Electronic equipment according to claim 4, wherein said fixed voltage is either a ground voltage, a voltage equal to a voltage on said common electrode, a center voltage of an image signal supplied over said image signal lines, a non-selection voltage of a scanning signal applied over said scanning signal lines, or a logic voltage supplied from driving means for driving said liquid crystal device.

6. Electronic equipment using a liquid crystal display device, said liquid crystal device including a pair of substrates, a liquid crystal disposed between said pair of substrates, a first one of the substrates having, thereon, scanning signal lines and image signal lines disposed in a matrix form, an active element connected to each of the scanning signal lines and image signal lines, a pixel electrode connected to the active element, and a common electrode, wherein an electric field is applied across the liquid crystal in a direction substantially parallel to a plane in which said pair of substrates lie, wherein a polarizing plate is formed on an outer surface of a second one of said substrates, and wherein said electronic equipment includes: an interconnection or a frame through which a fixed voltage is applied to said polarizing plate; and a power supply for supplying said fixed voltage via said interconnection or frame.

7. Electronic equipment according to claim 6, wherein said fixed voltage is either a ground voltage, a voltage equal to a voltage on said common electrode, a center voltage of an image signal supplied over said image signal lines, a non-selection voltage of a scanning signal applied over said scanning signal lines, or a logic voltage supplied from driving means for driving said liquid crystal device.

8. Electronic equipment using a liquid crystal display device, said liquid crystal device including a pair of substrates, a liquid crystal disposed between said pair of substrates, a first one of the substrates having, thereon, scanning signal lines and image signal lines disposed in a matrix form, an active element connected to each of the scanning signal lines and image signal lines, a pixel electrode connected to the active element, and a common electrode, wherein an electric field is applied across the liquid crystal in a direction substantially parallel to a plane in which said pair of substrates lie, wherein a transparent conducting film is formed on either an inner surface or an outer surface of a second one of said substrates, and voltage of said transparent conducting film is maintained in a floating state.

9. Electronic equipment using a liquid crystal display device, said liquid crystal device including a pair of substrates, a liquid crystal disposed between said pair of substrates, a first one of the substrates having, thereon, scanning signal lines and image signal lines disposed in a matrix form, an active element connected to each of the scanning signal lines and image signal lines, a pixel electrode connected to the active element, and a common electrode, wherein an electric field is applied across the liquid crystal in a direction substantially parallel to a plane in which said pair of substrates lie, wherein a conductive film is formed on a second one of said substrates, in a periphery of a pixel area on either an inner surface or an outer surface of said second one of said substrates, and voltage of said conductive film is maintained in a floating state.

10. Electronic equipment using a liquid crystal display device, said liquid crystal device including a pair of substrates, a liquid crystal disposed between said pair of substrates, a first one of the substrates having, thereon, scanning signal lines and image signal lines disposed in a matrix form, an active element connected to each of the scanning signal lines and image signal lines, a pixel electrode connected to the active element, and a common electrode, wherein an electric field is applied across the liquid crystal in a direction substantially parallel to a plane in which said pair of substrates lie, wherein a polarizing plate having an electrical conductivity is disposed on an outer surface of a second one of said substrates, and voltage of said polarizing plate is maintained in a floating state.

* * * * *